US012584041B2

(12) United States Patent
Jiang et al.

(10) Patent No.: US 12,584,041 B2
(45) Date of Patent: Mar. 24, 2026

(54) MICROPOROUS DRY ADHESIVE FILMS, METHODS OF MAKING, AND METHODS OF USE

(71) Applicant: University of Florida Research Foundation, Inc., Gainesville, FL (US)

(72) Inventors: Peng Jiang, Gainesville, FL (US); Yifan Zhang, Gainesville, FL (US); Calen Leverant, Gainesville, FL (US); Curtis Taylor, Gainesville, FL (US)

(73) Assignee: University of Florida Research Foundation, INC., Gainesville, FL (US)

( * ) Notice: Subject to any disclaimer, the term of this patent is extended or adjusted under 35 U.S.C. 154(b) by 47 days.

(21) Appl. No.: 18/025,507

(22) PCT Filed: Sep. 16, 2021

(86) PCT No.: PCT/US2021/071482
§ 371 (c)(1),
(2) Date: Mar. 9, 2023

(87) PCT Pub. No.: WO2022/061353
PCT Pub. Date: Mar. 24, 2022

(65) Prior Publication Data
US 2023/0348757 A1 Nov. 2, 2023

Related U.S. Application Data

(60) Provisional application No. 63/079,101, filed on Sep. 16, 2020.

(51) Int. Cl.
C09J 7/32 (2018.01)
C08J 9/26 (2006.01)
(Continued)

(52) U.S. Cl.
CPC . *C09J 7/32* (2018.01); *C08J 9/26* (2013.01); *C09J 5/08* (2013.01); *C09J 7/10* (2018.01); *C08J 2201/0442* (2013.01); *C08J 2207/02* (2013.01); *C08J 2335/02* (2013.01); *C09J 2301/306* (2020.08); *C09J 2301/414* (2020.08);
(Continued)

(58) Field of Classification Search
CPC ............................... C09J 7/32; C09J 2301/31
See application file for complete search history.

(56) References Cited

PUBLICATIONS

Fang, Y.; Ni, Y.; Choi, B.; Leo, S.Y.; Gao, J.; Ge, B.; Taylor, C.; Basile, V.; Jiang, P.; "Chromogenic Photonic Crystals Enabled by Novel Vapor-Responsive Shape-Memory Polymers", Advanced Materials. 2015, 27, p. 3696-3704 and Supporting Information.*
(Continued)

*Primary Examiner* — Humera N. Sheikh
*Assistant Examiner* — Julia L Rummel
(74) *Attorney, Agent, or Firm* — Thomas Horstemeyer LLP.

(57) ABSTRACT

Provided herein are materials, methods of making materials, and methods of use, wherein the materials have switchable adhesive properties. Materials of the present disclosure can reversibly change coloration in conjunction with the changing adhesive state. The films, made from a porous polymer material, can be reversibly changed from a smooth state to a rough state, allowing for reversible and tunable gripping and/or adhesive properties.

6 Claims, 4 Drawing Sheets

(51) Int. Cl.
    *C09J 5/08*       (2006.01)
    *C09J 7/10*       (2018.01)

(52) U.S. Cl.
    CPC ...... *C09J 2301/502* (2020.08); *C09J 2400/24*
              (2013.01); *C09J 2433/00* (2013.01)

(56)            References Cited

PUBLICATIONS

ISR Mailed Apr. 26, 2022; International Patent Application PCT/US2021/071482 Filed Sep. 16, 2021.

Zhang, Y et al. "Switchable Friction Coefficient on Shape Memory Photonic Crystals". MRS Advances .. Mar. 23, 2020; abstract; p. 1, first paragraph; p. 2, second-third paragraphs; p. 3, second paragraph; p. 4, first paragraph; DOI: 10.1557/adv.2020.182.

Kuroki, H et al. "Tunable Ultrathin Membranes with Nonvolatile Pore Shape Memory". ACS Appl. Mater. Interfaces .. Apr. 27, 2015; abstract; p. 10402, col. 1, second paragraph; DOI: 10.1021/acsami.5b01416.

* cited by examiner

MICROPOROUS DRY ADHESIVE FILMS, METHODS OF MAKING, AND METHODS OF USE

CROSS-REFERENCE TO RELATED APPLICATIONS

This application is the 35 U.S.C. § 371 national stage of PCT application having serial number PCT/US2021/071482, filed on Sep. 16, 2021. This application also claims priority to U.S. provisional application having Ser. No. 63/079,101 filed on Sep. 16, 2020, which are entirely incorporated herein by reference.

STATEMENT REGARDING FEDERALLY SPONSORED RESEARCH OR DEVELOPMENT

This invention was made with government support under Grant No. 1562861, awarded by the National Science Foundation. The government has certain rights in the invention.

BACKGROUND

There is a need for materials that can be removably applied to and adhere to most common solid surfaces without lubricants (dry adhesion). Dry adhesion is inspired by the adhesion mechanics exhibited by gecko's feet.

SUMMARY

Embodiments of the present disclosure provide for methods for fabricating a material having switchable adhesion, materials having switchable adhesion, methods of using materials having switchable adhesion, and the like.

An embodiment of the present disclosure includes a method for fabricating a porous polymer material having switchable adhesion. The method can include providing a plurality of particles in a volume between a first surface of a first substrate and at least one opposing second surface of a second substrate, wherein the plurality of particles includes an ordered array of nanoparticles. A shape memory polymerizable material can be added into the volume between the opposing first and second surfaces to surround the particles. The shape memory polymerizable material can be polymerized to form a polymer framework around the particles and the polymer framework exposed to oxygen plasma etching. The particles can be removed to form an ordered array of voids in the polymer framework.

An embodiment of the present disclosure also includes a porous polymer material having switchable adhesion, where the porous polymer material includes a shape memory polymeric material having ordered voids. The porous polymer material has a starting state, a deformed state, and a recovered state. When in the deformed state, the porous polymer material can have a surface roughness that is about 1 to 4 times greater than when in the starting state or the recovered state and when in the deformed state, the porous polymer material has a lower adhesion than when in the starting state or the recovered state.

An embodiment of the present disclosure also includes a method of using a porous polymer material having switchable adhesion. The method can include exposing the porous polymer material to a first stimulus to transition the porous polymer material from a starting state to a deformed state. The material has an adhesive property when in the starting state.

Other compositions, apparatus, methods, features, and advantages will be or become apparent to one with skill in the art upon examination of the following drawings and detailed description. It is intended that all such additional compositions, apparatus, methods, features and advantages be included within this description, be within the scope of the present disclosure, and be protected by the accompanying claims.

BRIEF DESCRIPTION OF THE DRAWINGS

Further aspects of the present disclosure will be more readily appreciated upon review of the detailed description of its various embodiments, described below, when taken in conjunction with the accompanying drawings.

Figures 1A, 1B, 1C, 1D, 1E, 1F:
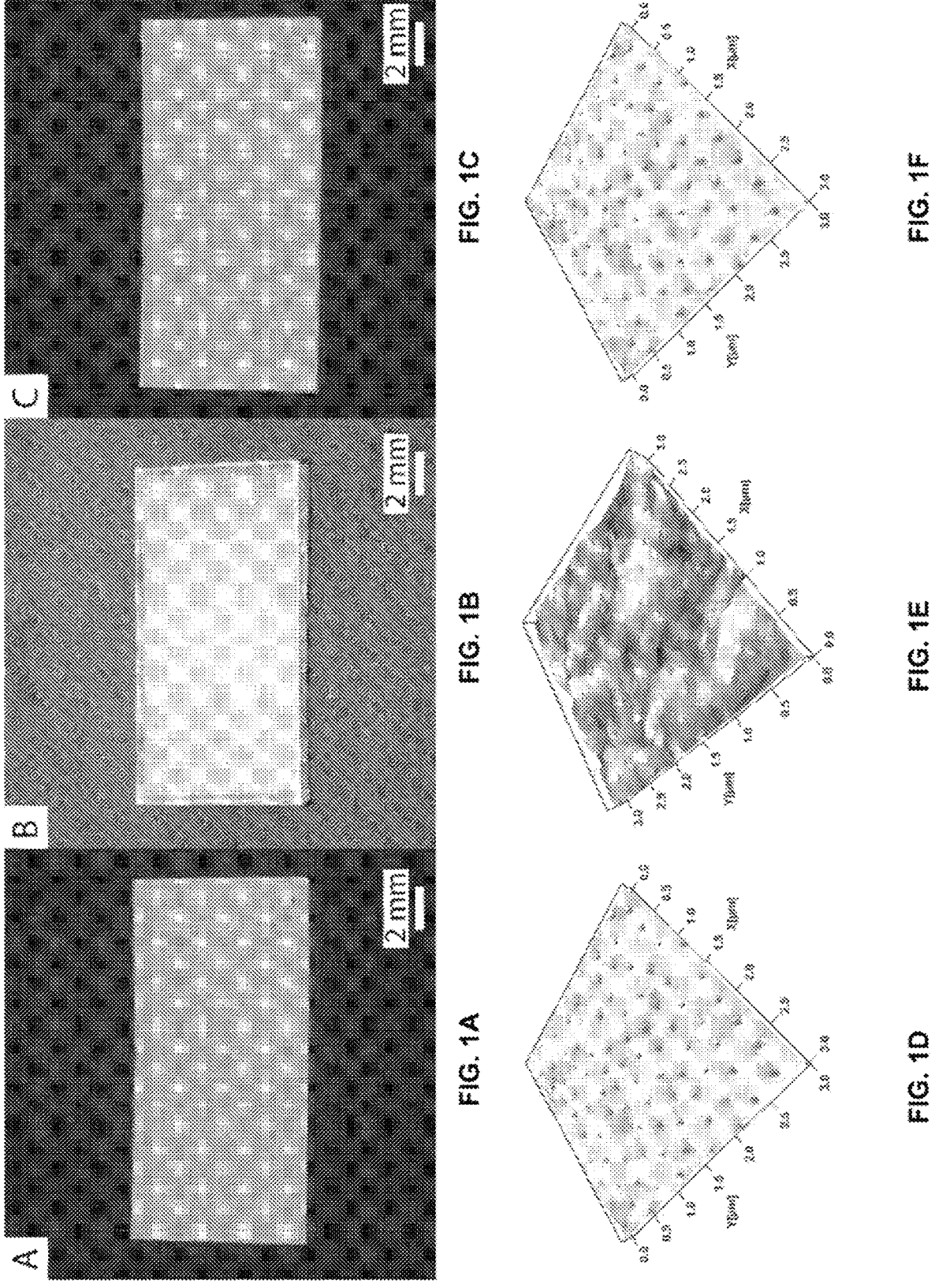
FIGS. 1A-1C are camera images of microporous shape memory polymer film in an original state (FIG. 1A), deformed state (FIG. 1B), and recovered state (FIG. 1C) according to embodiments of the present disclosure.
FIGS. 1D-1F show corresponding atomic force microscopy (AFM) surface topography of the film in an original state (FIG. 1D), deformed state (FIG. 1E), and recovered state (FIG. 1F).

The drawings illustrate only example embodiments and are therefore not to be considered limiting of the scope described herein, as other equally effective embodiments are within the scope and spirit of this disclosure.

DETAILED DESCRIPTION

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, material science, and the like, which are within the skill of the art.

The following examples are put forth so as to provide those of ordinary skill in the art with a complete disclosure and description of how to perform the methods and use the materials disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise.

As used herein, the following terms have the meanings ascribed to them unless specified otherwise. In this disclosure, "consisting essentially of" or "consists essentially" or the like, when applied to methods and compositions encompassed by the present disclosure refers to compositions like those disclosed herein, but which may contain additional structural groups, composition components or method steps (or analogs or derivatives thereof as discussed above). Such additional structural groups, composition components or method steps, etc., however, do not materially affect the basic and novel characteristic(s) of the compositions or methods, compared to those of the corresponding compositions or methods disclosed herein. "Consisting essentially of" or "consists essentially" or the like, when applied to methods and compositions encompassed by the present disclosure have the meaning ascribed in U.S. Patent law and the term is open-ended, allowing for the presence of more than that which is recited so long as basic or novel characteristics of that which is recited is not changed by the presence of more than that which is recited, but excludes prior art embodiments.

General Discussion

In accordance with the purpose(s) of the present disclosure, as embodied and broadly described herein, embodiments of the present disclosure, in some aspects, relate to materials, methods of making materials, and methods of use, wherein the materials have switchable adhesive properties. In an embodiment, materials of the present disclosure can reversibly change coloration in conjunction with the changing adhesive state.

In general, embodiments of the present disclosure provide for methods of fabricating a porous polymer material having switchable adhesive properties, methods of using switchable adhesive materials, porous polymer materials, and microporous photonic crystal films.

The present disclosure includes a method for programming specific photonic crystal patterns into nanostructured shape memory polymer (SMP) films to form a porous polymer material. Advantageously, the method can be used to make films that have switchable adhesion states. In other words, the films can be reversibly changed from a smooth state to a rough state, allowing for tunable gripping and/or adhesive properties.

The switchable adhesive includes microporous inverse opal photonic crystal film, which intrinsically have color changing properties when the shape memory polymer changes states. Advantageously, when the switchable adhesive changes states, the perceived visible color also changes. Therefore, the adhesion state can easily be perceived by a user.

In other embodiments, the methods can also be used to program nanoscale structures controlling disparate properties such as hydrophobicity and antireflection. Other advantages of embodiments of the present disclosure is that the process for making the porous polymer materials is simple, scalable, and inexpensive. In addition, embodiments of the present disclosure can be used in applications such as soft robotic fingers, body tissue interfaces, gecko feet bionics, consumer adhesive products, haptics, and the like.

In an embodiment, the method for fabricating the porous polymer material can include providing a plurality of particles in a volume between a first surface of a first substrate and at least one opposing second surface of a second substrate, where the plurality of particles includes an ordered array of nanoparticles. The nanoparticles can include silica, latex, or other nanoparticles as can be envisioned by one of ordinary skill in the art. A shape memory polymerizable material can be added into the volume between the surfaces to surround the particles. The shape memory polymerizable material can be polymerized to form a polymer framework around the particles. The particles can then be removed to form an ordered array of voids in the polymer framework.

In some embodiments, the porous polymer material can comprise multi-level adhesion films made according to the methods described above, wherein prior to removal of the particles, a further step of plasma etching is included.

The porous polymer material described herein has three distinct states: a starting state, a deformed state, and a recovered state. The starting state and the recovered state usually show shining iridescent colors determined by the diameter of the macropores of the films, while the deformed state usually has a transparent and/or translucent appearance. Under scanning electron microscope and atomic force microscope, the surface of the starting and the recovered states is much smoother than that of the deformed state. In the starting and recovered states, the porous polymer material appears iridescent and is smoother than in the deformed state. The material exhibits higher adhesion than when in the deformed state. In the deformed state, the material appears transparent and is rougher, exhibiting lower adhesion than in the original and/or recovered states.

In some embodiments, when in the deformed state, the porous polymer material can have a surface root mean square roughness of about 40 nm to 200 nm, or about 52 nm, and when in the starting state or the recovered state, the porous polymer material has a surface root mean square roughness of about 5 nm to 50 nm, or about 17 nm.

In some embodiments, the mean adhesion on a porous polymer material film in the recovered state can be about 1 mN to about 1.5 mN or about 1.2 mN and the mean adhesion on a film in the deformed state can be about 0.5 mN.

The porous polymer material can be transitioned to a deformed state by applying a first stimulus, causing the voids to collapse. The first stimulus can be strong capillary pressure generated by the evaporation of water from the interconnected macropores to squeeze the ordered pores into the deformed state. In an alternative to this simple "cold" programming process, an externally applied mechanical force can also be applied by using a hydraulic press to manually deform the pores. The porous polymer material can be transitioned from the deformed state to the recovered states by applying a second stimulus, causing the voids to swell. In some embodiments, the first stimulus can be exposure to water, due to its high surface tension, and subsequent drying. In some embodiments, the second stimulus can be exposure to a solvent and subsequent drying, the solvent including but not limited to ethanol, acetone, benzene, toluene, and hexane.

As described above, the porous polymer material can be rinsed with or submerged in water to return it to a deformed state. The water can be evaporated to induce the collapse of the voids. The evaporation of water creates a large capillary pressure that is higher than the elastic modulus of the polymer, leading to the collapse of the voids. In some embodiments, the porous polymer materials can be deformed by simply applying an external pressure at room temperature and/or at a temperature higher than the glass transition temperature of the polymer. The method can further include exposing the porous polymer material to the second stimulus to return it to the recovered state. Advantageously, the switching can be performed repeatedly. The material can be switched to the deformed state or the recovered state repeatedly by exposing the masked region to water or the second stimulus, respectively.

In various embodiments, the second stimulus can be a solvent (e.g., hexane, acetone, ethanol, toluene) or vapors thereof. In other embodiments, the second stimulus can be a mechanical impact, an external pressure, a shear stress, heat, microwave radiation, an unreacted monomer, a small organic molecule, or a laser energy.

The shape memory polymerizable material can include thermoplastic polymer and/or thermoset polymers. In various embodiments, the shape memory polymerizable material can include ethoxylated(20) trimethylolpropane triacrylate (SR415), polyethylene glycol (PEG), polyethylene, polyvinyl chloride (PVC), polyurethane, epoxy, polystyrene, polymethyl methacrylate (PMMA), polymethyl acrylate (PMA), silicone rubber, polyolefins, polyesters, polyamides, polytetrafluoroethylene (PTFE), and the like. The shape memory polymerizable material can include a blend of polyurethane with PEG, polyurethane with polyacrylates, polyesters with epoxy, PEG with polyolefins, PMMA with PEG, PMA with PEG, ethoxylated trimethylolpropane triacrylate and polyethylene glycol diacrylate, a blend of an aliphatic polyester/polyether-based trifunctional urethane acrylate oligomer and blended with tripropylene glycol diacrylate, or combinations thereof.

In an embodiment, the distance between at least two pairs of adjacent voids is substantially the same (e.g., about 100 nm to 1000 nm). In an embodiment, the number of unique pairs in a 1 cm×1 cm×10 µm sample can be about 10, 100, 1000, 10,000, 100,000, 1,000,000, 100,000,000, 100,000,000, to about 10, 100, 1000, 10,000, 100,000, 1,000,000, 100,000,000, 100,000,000, $1\times10^{10}$, $1\times10^{12}$, $1\times10^{15}$, $1\times10^{17}$, or $1\times10^{20}$ and any set of ranges (e.g., about 10,000 to 100,000, about 100 to $1\times10^{10}$, etc.) within these numbers or subranges (e.g., about 15 to 200,000, 2,500,000 to $3\times10^{12}$, etc.) within these numbers.

In an embodiment, the distance between each pair of adjacent voids is substantially the same. In an embodiment, the distance between a portion of the pairs of adjacent voids is substantially the same. In an embodiment, the "portion" can be about 50% or more, about 60% or more, about 70% or more, about 80% or more, about 90% or more, about 99% or more, or about 100%, over a defined area of the porous polymer layer. In an embodiment, the defined area can include about 50% or more, about 60% or more, about 70% or more, about 80% or more, about 90% or more, about 95% or more, about 99% or more, or about 100%, of the area of the porous polymer layer. The term "substantially" in these contexts can mean about 50% or more, about 60% or more, about 70% or more, about 80% or more, about 90% or more, about 99% or more, or about 100%. The term "adjacent" refers to two voids next to one another without a void separating them in the same porous polymer material.

In an embodiment, a polymer framework separates the voids. In an embodiment, the diameter (or longest distance across the void) of substantially all of the voids can be substantially equivalent. In an embodiment, the diameter is about 0.03 micrometers to 10 micrometers. The term "substantially" in this context can mean about 50% or more, about 60% or more, about 70% or more, about 80% or more, about 90% or more, about 99% or more, or about 100%.

In an embodiment, the porous polymer material is formed by disposing particles (e.g., nanoparticles) onto a surface to form an array of particles. In an embodiment, a monomer mixture can be disposed on a surface using capillary forces (See Examples) or using a process such as a doctor blade coating process, tape casting, or applying a simple shear force by two plates with a controlled gap in between. The particles can be aligned in a three-dimensionally ordered colloidal crystal array, e.g., the particles can be located in crystalline lattices of, for example, a face-centered cubic (f.c.c.), hexagonal-centered cubic (h.c.p.) crystals, randomly close-packed crystals, or the like. After the monomer mixture is disposed on the particle array, the monomer mixture can be polymerized to form a co-polymer membrane having particles disposed in the polymer membrane. In an embodiment, the polymerization can be photopolymerization, thermopolymerization, or a combination thereof.

Subsequently, a portion (e.g., about 50%, 60%, 60%, 80%, 90%, 95%, 99% or more, or about 100%) or all of the particles can be removed to form the porous polymer material. In an embodiment, the particles can be removed by a process that does not alter the polymer. The type of process used to remove the particles depends, at least in part, upon the type of nanoparticle and the polymer. In an embodiment, the porous polymer material is formed by dissolving the particles using an acid solution such as, but not limited to, hydrofluoric acid (e.g., for silica nanoparticles). The porous polymer material including an array of voids is formed once the particles are removed.

As mentioned above, the voids are made from the removal of one or more particles. In an embodiment, the particles are disposed on top of one another in the polymer membrane, and when the particles are removed, a void is formed in the place of each particle. In an embodiment, the voids are distinct from one another and in another embodiment the voids are interconnected to form interconnected volumes that can form channels within and/or through the porous polymer material.

In an embodiment the monomer mixture can include two or more acrylate monomers such as those described herein, where each monomer can be about 5 to 95 weight percent of the monomer mixture. In an embodiment the prepolymer mixture can include an ethoxylated trimethylolpropane triacrylate (ETPTA) and a polyethylene glycol diacrylate (PEGDA). In an embodiment, the volumetric ratio of ETPTA to PEGDA can be about 1:1 to 1:10 or about 1:2 to 1:6. In addition, the monomer mixture can include a polymer initiating agent such as a photoinitiator (e.g., 2-hydroxy-2-methyl-1-phenyl-1-propanone, azobisisobutyronitrile, or 2,2-dimethoxy-2-phenylacetophenone). The amount of initiator used depends upon the polymerization process, the monomers, and the like.

Once the monomer is polymerized, a polymer framework is formed around the particles. After the particles are removed, the polymer framework supports the porous polymer material. The mechanical characteristics of the polymer framework can be controlled by selection of the monomers, the ratio of the monomer, the amount of the initiator, and the like. The dimensions of the polymer framework can be controlled by the process of disposing the monomer/particle mixture on the substrate. In an embodiment, the thickness of the polymer framework between adjacent particles can be about 100 nm to 1000 nm.

In an embodiment, the particles can be of the same or different type and/or same or different size, depending on the use or purpose of the porous polymer material. The selection of the type particle can depend upon the process for removing the particle, the type of polymer, and/or polymer framework. In an aspect, the particles are nanoparticles. The selection of the size can depend upon the process for removing the nanoparticles, the type of polymer, the polymer framework, the diameter of the desired voids and channel, and the like. In an embodiment, two or more different types and/or sizes of nanoparticles can be selected. In an embodiment, two or more processes can be used to remove nanoparticles (e.g., when two or more types of nanoparticles are used in the monomer/nanoparticle mixture). The type of nanoparticle can include silica nanoparticles, polymer latex nanoparticles, titania nanoparticles, CdSe nanoparticles, Au nanoparticles, and other nanoparticles where the type selected has a uniform diameter. In an embodiment, the nanoparticles can have a diameter of about 100 to 1000 nm or about 200 to 500 nm.

In an embodiment, the nanoparticles can include latex and the trigger stimulus can be an organic solvent (e.g. ethanol, isopropanol, butanol, methanol, hexane, etc.).

Existing switchable friction materials such as those used in soft robotic finger applications, for example, rely on manipulating viscosity of a lubricant. Advantageously, the materials used herein provide dry adhesion.

Advantageously, the adhesion of the switchable adhesives described herein may be removed and/or released without the use of chemicals used for traditional adhesives such as glue.

The plasma etching step enlarges the open pores/voids on the surface. The open pores can lead to larger contact areas and thus higher adhesion force. The thickness of the macroporous layer can range from about 3 microns to over 300 microns. The plasma etching usually affects the macropores in the top layer of 2-3 micron thickness. The diameter of the top-layer pores can be enlarged from about 50 nm to 100 nm prior to plasma etching to about 300 nm after the oxygen plasma etching process.

Dry adhesion as used herein indicates the adhesion caused by simple physical interaction (e.g., van deer Waals force) between the adhesive and the substrate to be adhered to. Dry adhesion is inspired by the adhesion mechanics exhibited by gecko's feet. It is envisioned that by using other hydrophobic shape memory polymers, the same mechanism could also work in the presence of water, such as in body tissues. The materials described herein can be applied to and adhere to most common solid surfaces without lubricants.

The materials described herein can potentially be used in a variety of industrial or consumer applications. The fundamental mechanisms can be translated to large objects, such as, for example, suction cups. The surface of the microporous films can be envisioned as being composed of millions of tiny, micrometer-scale suction cups. The weight the material can support is dependent upon on the area of the adhesion and the nature of the macroporous polymer surface and the substrate surface. Once the polymer and the substrate is fixed, the supported weight can be predicted by the total area of the adhesive film. The dry adhesives described herein can be used in consumer applications such as adhesive tapes or removable adhesives such as wall mounts. Advantageously, only a small amount of water and ethanol are needed to trigger the shape memory effects, and the opening and closure of the pores and thus affect the final adhesion forces can be changed rapidly.

EXAMPLES

Now having described the embodiments of the disclosure, in general, the examples describe some additional embodiments. While embodiments of the present disclosure are described in connection with the example and the corresponding text and figures, there is no intent to limit embodiments of the disclosure to these descriptions. On the contrary, the intent is to cover all alternatives, modifications, and equivalents included within the spirit and scope of embodiments of the present disclosure.

A new approach that combines microporous shape memory polymer (SMP) with switchable dry adhesion is described herein. This technology has potential applications in situations which require double or multiple adhesive levels, including but not limited to soft robotic fingers,[1, 2] body tissues interfaces,[3] gecko feet bionics,[4, 5] etc. Additionally, the adhesion states are coupled with structural color resulting from the intrinsic photonic crystal structure of the SMP films. Changes in adhesion states are indicated by easily perceived visible color changes.

The technology is to manipulate interfacial dry adhesion by changing surface roughness, using microporous inverse opal photonic crystal films. In our previous work, we have shown that the periodic nanostructure of SMP films can be deformed and recovered by heat,[6] solvent[7-9] and other external stimuli.[10, 11] As shown in FIG. 1, the original shining (also referred to as iridescent) film (FIG. 1A) is programmed to a transparent state (FIG. 1B) by water swelling and drying. The same film is recovered to the permanent, shining state (FIG. 1C) after swelling and drying from ethanol. During this microstructural transition, the surface roughness changes by nearly three-fold. The original and recovered films have smooth surfaces, with a root mean square (RMS) roughness of ~17 nm, while the deformed film has a much rougher surface whose RMS roughness is ~52 nm. FIGS. 1D, 1E, and 1F show the atomic force microscope (AFM) topography of the original, deformed and recovered films, respectively.

Figures 2A, 2B:
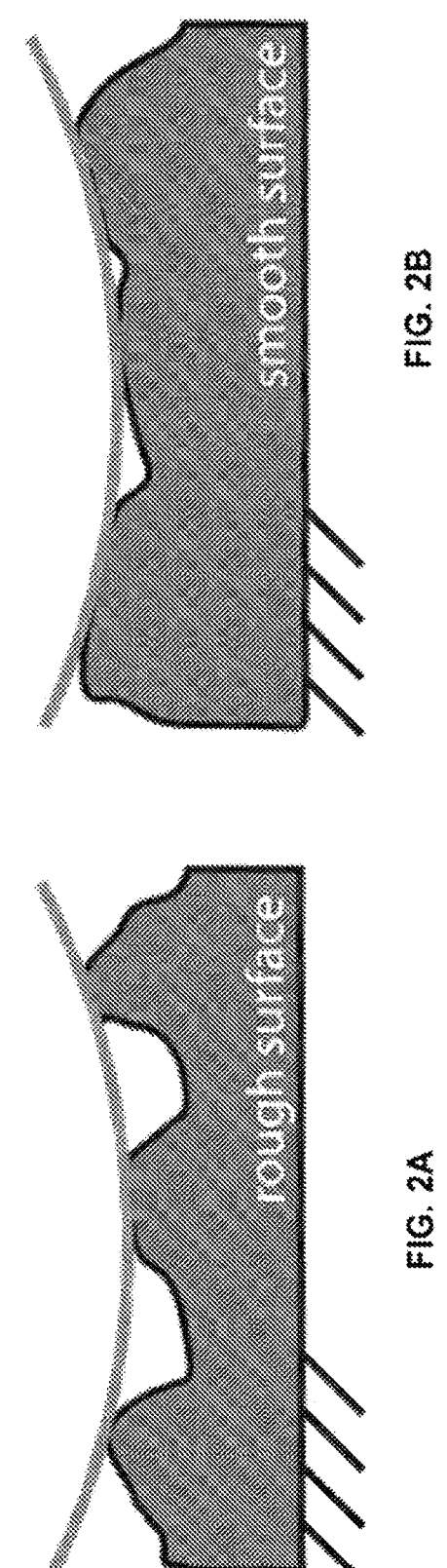
FIGS. 2A-2B provide a schematic illustration of the relationship between real contact area and surface roughness. A rough surface (FIG. 2A) has less real contact area than a smooth surface (FIG. 2B), according to embodiments of the present disclosure.
Figures 3A, 3B, 3C, 3D:
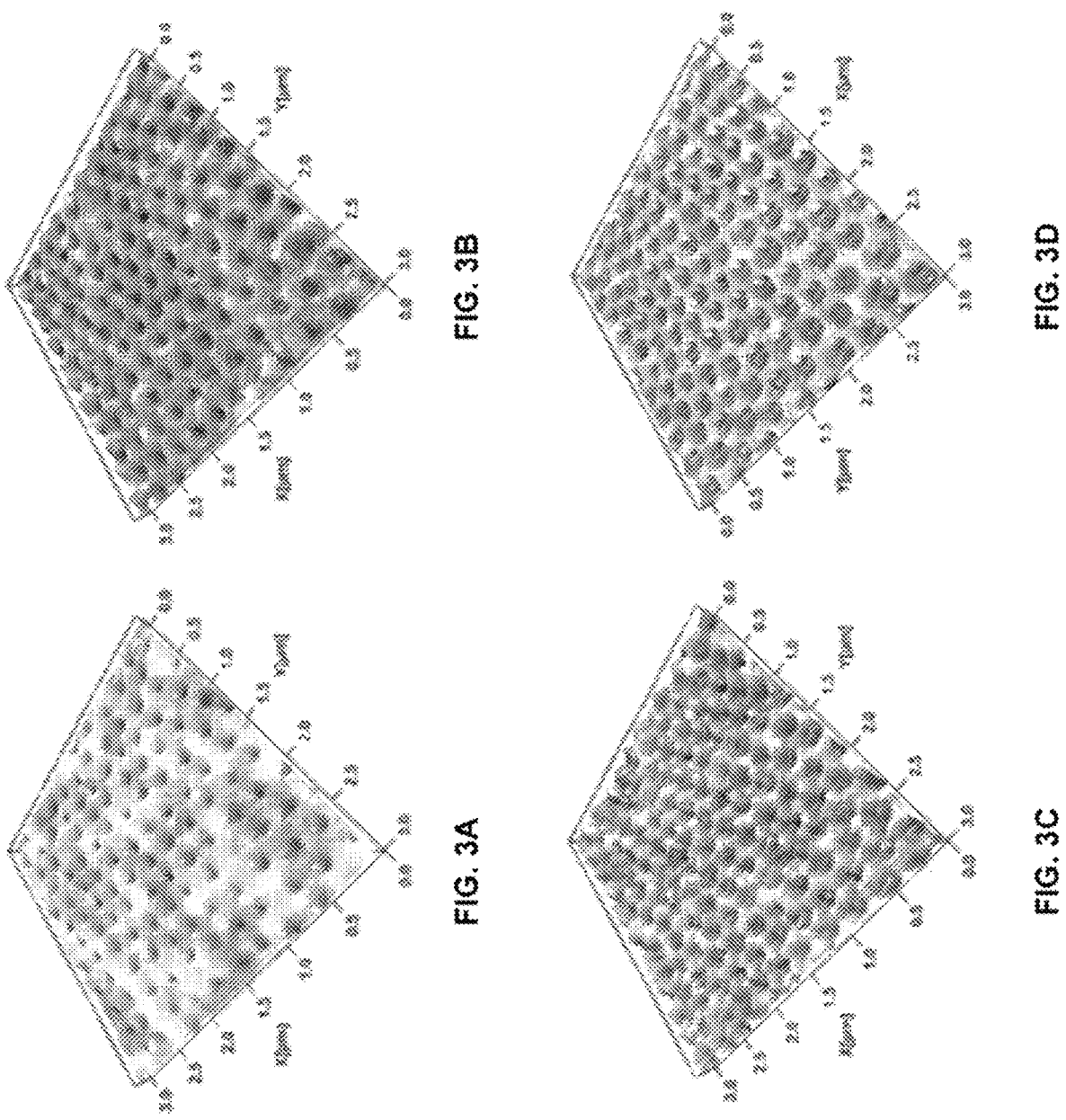
FIGS. 3A-3D show example AFM surface topography of microporous SMP dry adhesion films after 0 s (FIG. 3A), 10 s (FIG. 3B), 20 s (FIG. 3C), and 30 s (FIG. 3D) oxygen plasma etching.

According to contact mechanics, real interfacial contact area is a critical factor in determining dry adhesion,[12] with higher real contact area resulting in higher interfacial adhesion. As the real contact area is inversely proportional to surface roughness (FIGS. 2A-2B), a smoother surface usually leads to a higher adhesion.[13] Based on the theory and the shape memory effect mentioned above, the film under original or recovered state with lower RMS roughness has higher interfacial dry adhesion and the film under deformed state with higher RMS roughness results in lower dry adhesion. The adhesion level can be easily switched by programming and recovering the microporous SMP film.

We have also successfully realized multiple adhesion levels by plasma-etching the microporous SMP film to render varied surface roughness levels. The surface micropores get larger as the plasma etching time increases. FIGS. 3A-3D show the AFM topography of a SMP film after 0, 10, 20, and 30 s of oxygen plasma etching. As the exposed micropore size increases with longer etching time, the real contact area at the surface decreases, diminishing the final dry adhesion.

Experimental Procedures

To prepare the switchable SMP dry adhesion films, highly ordered silica colloidal crystals were assembled by the convective self-assembly technique.[14] The colloidal crystal was then placed between two glass microslides to construct a sandwich cell. The cell thickness was controlled by using 24 layers of double-sided tape. Two commercial oligomers (from Sartomer), polyethylene glycol (600) diacrylate (SR610) and ethoxylated(20) trimethylolpropane triacrylate (SR415), were mixed in a 3:1 volumetric ratio. 2 wt. % photoinitiator, 2-hydroxy-2-methyl-1-phenyl-1-propanone (Darocur 1173, BASF), was then added. The oligomer mixture was infiltrated into the sandwich cell to fill up the interspatial voids between the self-assembled silica particles and finally exposed to 365 nm ultraviolet light for 90 mins to fully cure the oligomers. The photocured sample was submerged in an aqueous hydrofluoric acid solution (2 vol. %) for 2 hours to remove templating silica particles. The final microporous SMP film was rinsed by deionized water and dried in air.

To prepare multi-level adhesion films, the colloidal template and the sandwich cell were made using the aforementioned methods. A new oligomer from Sartomer, ethoxylated (20) trimethylolpropane triacrylate (SR415), was mixed with 2 wt. % photoinitiator (Darocur 1173). After the oligomer was infiltrated and photo-cured under the same conditions as mentioned above, the silica colloidal crystal-polymer nanocomposite was exposed to oxygen plasma etching for varied durations from 0 to 30 s. The templating silica particles remaining in the dry-etched film were removed by using the same hydrofluoric acid wash as mentioned above.

The dry adhesion properties of the microporous SMP films were characterized by micro-indentation on a Hysitron® Biosoft Indenter. The tip used during indentation was a glass hemisphere with 1.35 mm radius. The indentation tests were maximal load controlled with a speed 500 nm/s. The adhesion was read as the maximum force during unloading.

Figures 4A, 4B, 5:
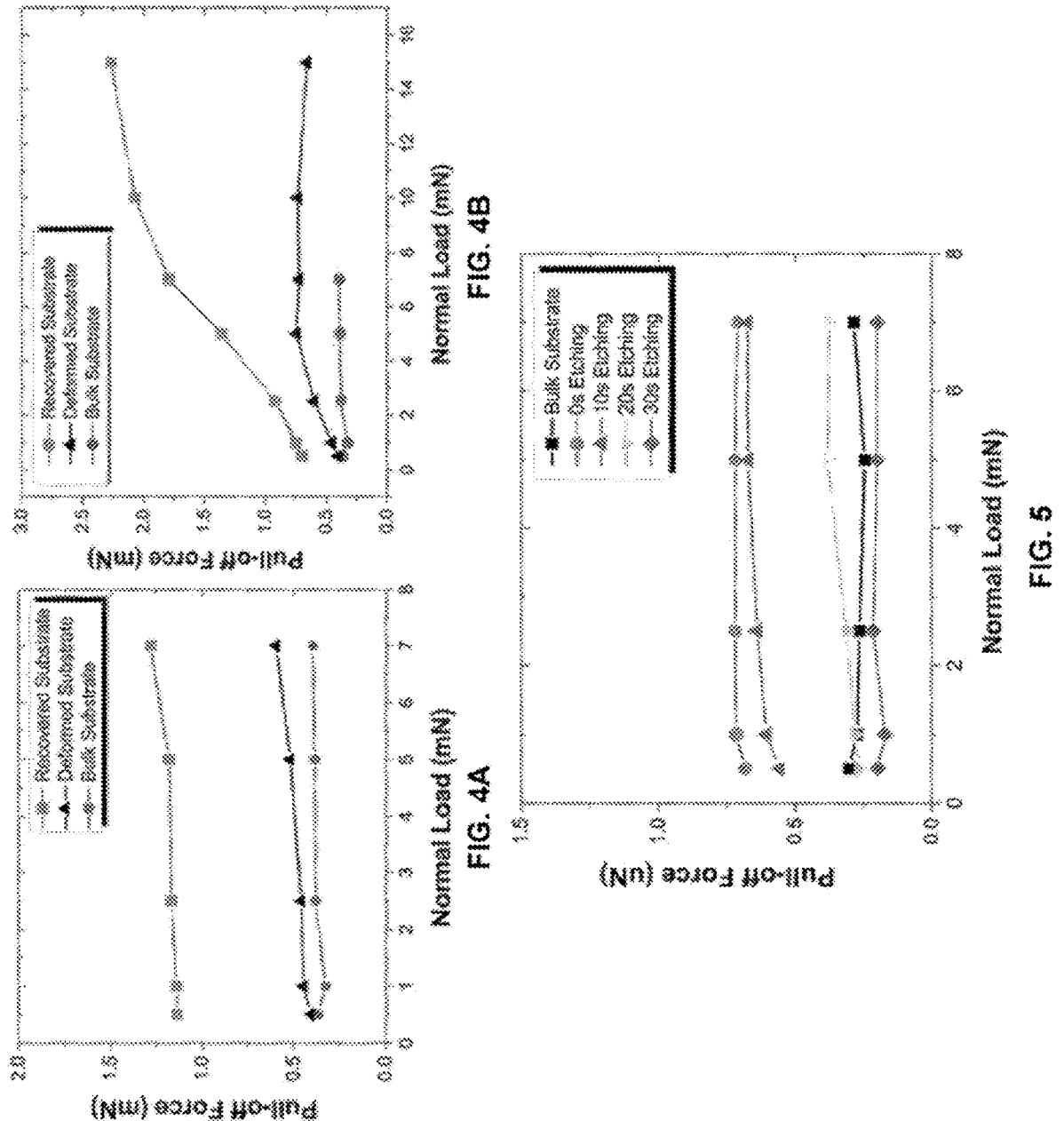
FIGS. 4A-4B are graphs showing switchable adhesion force on microporous SMP films with 300 nm (FIG. 4A) and 200 nm (FIG. 4B) micropores under different normal loads, according to embodiments of the present disclosure.
FIG. 5 illustrates the results of multi-level adhesion films prepared by controlling the oxygen plasma etching time.

Two kinds of switchable dry adhesion films with 300 nm and 200 nm diameter micropores were investigated. As shown in FIG. 4A and FIG. 4B, the recovered SMP film with ordered micropores (i.e., lower RMS roughness) exhibits higher adhesion than the deformed film. The bulk SMP film with a flat surface was prepared by photopolymerizing monomers in between two flat glass microslides and then separating the film from the slides. The film was also tested as a control and it displays the lowest adhesion. The average adhesion on the recovered and deformed films with 300 nm diameter micropore is 1.2 mN and 0.5 mN, respectively. As shown in FIG. 4A, this type of SMP film exhibits stable adhesion (i.e., the amplitude of the normal load does not affect the adhesion level). Similar to the film with 300 nm micropores, the recovered SMP film with 200 nm micropores shows higher adhesion than the deformed one under the same normal load. However, the SMP film with 200 nm micropores exhibits normal load-dependent adhesion behavior (FIG. 4B). On the recovered film, the adhesion force increases from 0.65 mN to 2.2 mN (as the normal load increases from 0.5 mN to 15 mN. On the deformed sample, the adhesion force rises from 0.42 mN to 1.38 mN under the same normal load range.

The results of multi-level adhesion films prepared by controlling the oxygen plasma etching time were shown in FIG. 5. The original microporous SMP film without any oxygen plasma etching (0 s) displays the highest adhesion of ~0.75 mN. As the etching time increases, more polymer on the sample surface was removed and the film shows gradually reduced adhesion. When etching time reaches 30 s, the adhesion on the final microporous film is even lower than the bulk polymer substrate. The adhesion on plasma etching films were also independent on the normal load.

The effects of plasma etching on adhesion depend on the rigidity of the surface to which the SMP film is adhered. If the surface is flexible, it can conform to the additional exposed area from plasma etching, increasing the total amount of contact, and therefore increasing the adhesion. Adhering the film to a rigid surface that does not make conformal contact with the SMP film, leads to lower total contact area and lower adhesion.

Example 1 References

1. Hua, J.; Björling, M.; Grahn, M.; Larsson, R.; Shi, Y., A smart friction control strategy enabled by CO 2 absorption and desorption. *Scientific reports* 2019, 9 (1), 1-8.

2. Liu, D.; Broer, D. J., Self-assembled dynamic 3D fingerprints in liquid-crystal coatings towards controllable friction and adhesion. *Angewandte Chemie International Edition* 2014, 53 (18), 4542-4546.

3. Yuk, H.; Varela, C. E.; Nabzdyk, C. S.; Mao, X.; Padera, R. F.; Roche, E. T.; Zhao, X., Dry double-sided tape for adhesion of wet tissues and devices. *Nature* 2019, 575 (7781), 169-174.

4. Raut, H. K.; Baji, A.; Hariri, H. H.; Parveen, H.; Soh, G. S.; Low, H. Y.; Wood, K. L., Gecko-inspired dry adhesive based on micro-nanoscale hierarchical arrays for application in climbing devices. *ACS applied materials & interfaces* 2018, 10 (1), 1288-1296.

5. Tian, H.; Li, X.; Shao, J.; Wang, C.; Wang, Y.; Tian, Y.; Liu, H., Gecko-Effect Inspired Soft Gripper with High and Switchable Adhesion for Rough Surfaces. *Advanced Materials Interfaces* 2019, 6 (18), 1900875.

6. Fang, Y.; Leo, S.-Y.; Ni, Y.; Wang, J.; Wang, B.; Yu, L.; Dong, Z.; Dai, Y.; Basile, V.; Taylor, C., Reconfigurable photonic crystals enabled by multistimuli-responsive shape memory polymers possessing room temperature shape processability. *ACS applied materials & interfaces* 2017, 9 (6), 5457-5467.

7. Fang, Y.; Ni, Y.; Choi, B.; Leo, S. Y.; Gao, J.; Ge, B.; Taylor, C.; Basile, V.; Jiang, P., Chromogenic photonic crystals enabled by novel vapor-responsive shape-memory polymers. *Advanced Materials* 2015, 27 (24), 3696-3704.

8. Leo, S. Y.; Ni, Y.; Xu, C.; Zhang, Y.; Dai, Y.; Qi, P.; Xie, A. T.; Basile, V.; Taylor, C.; Jiang, P., Programmable Macroporous Photonic Crystals Enabled by Swelling-Induced All-Room-Temperature Shape Memory Effects. *Advanced Functional Materials* 2017, 27 (41), 1703522.

9. Leo, S. Y.; Zhang, W.; Zhang, Y.; Ni, Y.; Jiang, H.; Jones, C.; Jiang, P.; Basile, V.; Taylor, C., Chromogenic Photonic Crystal Sensors Enabled by Multistimuli-Responsive Shape Memory Polymers. *Small* 2018, 14 (12), 1703515.

10. Fang, Y.; Ni, Y.; Leo, S.-Y.; Taylor, C.; Basile, V.; Jiang, P., Reconfigurable photonic crystals enabled by pressure-responsive shape-memory polymers. *Nature communications* 2015, 6 (1), 1-8.

11. Leverant, C. J.; Leo, S.-Y.; Cordoba, M. A.; Zhang, Y.; Charpota, N.; Taylor, C.; Jiang, P., Reconfigurable Anti-counterfeiting Coatings Enabled by Macroporous Shape Memory Polymers. *ACS Applied Polymer Materials* 2018, 1 (1), 36-46.

12. Yang, C.; Persson, B.; Israelachvili, J.; Rosenberg, K., Contact mechanics with adhesion: interfacial separation and contact area. *EPL (Europhysics Letters)* 2008, 84 (4), 46004.

13. Persson, B. N.; Scaraggi, M., Theory of adhesion: Role of surface roughness. *The Journal of chemical physics* 2014, 141 (12), 124701.

14. Jiang, P.; Bertone, J.; Hwang, K. S.; Colvin, V., Single-crystal colloidal multilayers of controlled thickness. *Chemistry of Materials* 1999, 11 (8), 2132-2140.

Aspects of the Disclosure

The present disclosure will be better understood upon reading the following numbered aspects, which should not be confused with the claims. Any of the numbered aspects below can, in some instances, be combined with aspects described elsewhere in this disclosure and such combinations are intended to form part of the disclosure.

Aspect 1. A method for fabricating a porous polymer material having switchable adhesion, comprising: providing a plurality of particles in a volume between a first surface of a first substrate and at least one opposing second surface of a second substrate, wherein the plurality of particles includes an ordered array of nanoparticles; adding a shape memory polymerizable material into the volume between the opposing first and second surfaces to surround the particles; polymerizing the shape memory polymerizable material to form a polymer framework around the particles; exposing the polymer framework to oxygen plasma etching; and removing the particles to form an ordered array of voids in the polymer framework.

Aspect 2. The method of aspect 1, wherein the porous polymer material has a starting state, a deformed state, and a recovered state; and wherein when in the deformed state, the porous polymer material has a surface roughness that is about 1 to 4 times greater than when in the starting state or the recovered state.

Aspect 3. The method of aspect 2, wherein a mean adhesion of the porous polymer material film in the recovered state is about 1 mN to about 1.5 mN, and the mean adhesion in the deformed state is about 0.5 mN.

Aspect 4. The method of any of aspects 1-3, wherein the particles are selected from silica nanoparticles, polymer latex nanoparticles, titania nanoparticles, CdSe nanoparticles, or Au nanoparticles.

Aspect 5. The method of any of aspects 1-4, wherein the particle comprises silica; and wherein the shape memory polymerizable material comprises a blend of ethoxylated trimethylolpropane triacrylate and polyethylene glycol diacrylate, a blend of an aliphatic polyester/polyether-based trifunctional urethane acrylate oligomer and blended with tripropylene glycol diacrylate, or combinations thereof.

Aspect 6. The method of any of aspects 1-5, wherein the porous polymer material is a photonic crystal membrane, wherein when the voids in a region are in a deformed state the region is substantially transparent, and wherein when the voids in a region are in a recovered state the region has a non-transparent color.

Aspect 7. A porous polymer material having switchable adhesion, where the porous polymer material comprises a shape memory polymeric material comprising ordered voids; wherein the porous polymer material has a starting state, a deformed state, and a recovered state; wherein when in the deformed state, the porous polymer material has a surface roughness that is about 1 to 4 times greater than when in the starting state or the recovered state; and wherein when in the deformed state, the porous polymer material has a lower adhesion than when in the starting state or the recovered state.

Aspect 8. The porous polymer material of aspect 7, wherein the porous polymer material is transitioned to the deformed state from either the starting state or deformed state by exposure of the porous polymer material to a first stimulus; and wherein the porous polymer material is transitioned to the recovered state from the deformed state by exposure of the porous polymer material to a second stimulus.

Aspect 9. The porous polymer material of any of aspects 7-8, wherein porous polymer material has the characteristic of being switchable from the deformed state to the recovered state or from the recovered state to the deformed state repeatedly.

Aspect 10. The porous polymer material of any of aspects 7-9, wherein the first stimulus is water.

Aspect 11. The porous polymer material of any of aspects 7-10, wherein the second stimulus is a solvent selected from hexane, acetone, ethanol, toluene, or vapors thereof.

Aspect 12. The porous polymer material of any of aspects 7-11, wherein the porous polymer material has a thickness of about 1 micrometer to 300 micrometers.

Aspect 13. The porous polymer material of any of aspects 7-12, wherein when in the deformed state, the porous polymer material has a surface root mean square roughness of about 40 nm to 200 nm; and when in the starting state or the recovered state, the porous polymer material has a surface root mean square roughness of 5 nm to 50 nm.

Aspect 14. The porous polymer material of any of aspects 7-13, wherein when in the recovered state the porous polymer material film has a mean adhesion of about 1 mN to about 1.5 mN, and when in the deformed state the porous polymer material film has a mean adhesion of about 0.5 mN.

Aspect 15. A method of using a porous polymer material having switchable adhesion comprising: exposing the porous polymer material to a first stimulus to transition the porous polymer material from a starting state to a deformed state; wherein the material has an adhesive property when in the starting state.

Aspect 16. The method of aspect 15, further comprising: exposing the porous polymer material to a second stimulus to transition the porous polymer material from the deformed state to a recovered state; wherein the material is less adhesive in the deformed state than in the recovered state.

Aspect 17. The method of aspect 16, wherein the first stimulus is water and the second stimulus is a solvent selected from hexane, acetone, ethanol, toluene, or vapors thereof.

Aspect 18. The method of aspect 15, further comprising applying the porous polymer material in a starting state or a recovered state to a surface to adhere the porous polymer material to the surface.

Aspect 19. The method of any of aspects 16-18, wherein the porous polymer material is present on a product such that the product has the adhesive properties of the porous polymer material.

Aspect 20. The method of any of aspects 16-19, further comprising exposing the porous polymer material in a starting state or a recovered state to water to detach the porous polymer material from the surface.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, "about 0" can refer to 0, 0.001, 0.01, or 0.1. In an embodiment, the term "about" can include traditional rounding according to significant figures of the numerical value. In addition, the phrase "about 'x' to 'y'" includes "about 'x' to about 'y'".

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

What is claimed is:

1. A porous polymer material having switchable adhesion, where the porous polymer material comprises: a shape memory polymeric material comprising ordered voids, wherein the porous polymer material has a macroporous layer that has a first region and second region, wherein the first region is at a top surface of the macroporous layer and the second region is under the first region, wherein the first region is about 2-3 microns thick, wherein the first region has pores with a diameter of about 300 nm, wherein the second region has pores with a diameter of about 100 nm;
wherein the porous polymer material has a starting state, a deformed state, and a recovered state;
wherein when in the deformed state, the porous polymer material has a surface roughness that is greater than when in the starting state or the recovered state; and
wherein when in the deformed state, the porous polymer material has a lower adhesion to a surface than an adhesion of the starting state or the recovered state to the surface,
wherein the macroporous layer has a thickness of about 3 micrometer to 300 micrometers.

2. The porous polymer material of claim 1, wherein the porous polymer material is transitioned to the deformed state from either the starting state or deformed state by exposure of the porous polymer material to a first stimulus; and
wherein the porous polymer material is transitioned to the recovered state from the deformed state by exposure of the porous polymer material to a second stimulus.

3. The porous polymer material of claim 1, wherein porous polymer material has the characteristic of being switchable from the deformed state to the recovered state or from the recovered state to the deformed state repeatedly.

4. The porous polymer material of claim 1, wherein the first stimulus is water.

5. The porous polymer material of claim 1, wherein the second stimulus is a solvent selected from hexane, acetone, ethanol, toluene, or vapors thereof.

6. The porous polymer material of claim 1, wherein
when in the deformed state, the porous polymer material has a surface root mean square roughness of about 40 nm to 200 nm; and
when in the starting state or the recovered state, the porous polymer material has a surface root mean square roughness of 5 nm to 50 nm.

* * * * *